(12) United States Patent
Zhao et al.

(10) Patent No.: US 9,669,896 B2
(45) Date of Patent: Jun. 6, 2017

(54) SENSOR ARRANGEMENT FOR CONTROLLING AN AUXILIARY MOTOR AND A WHEEL HUB UNIT WITH SUCH A SENSOR ARRANGEMENT

(71) Applicant: MAXON MOTOR AG, Sachseln (CH)

(72) Inventors: Chen Zhao, Thalwil (CH);
Franz-Xaver Folmli, Oberdorf (CH);
Max Erick Busse-Grawitz, Alpnach Dorf (CH); Mathis Trachsel, Lucerne (CH)

(73) Assignee: MAXON MOTOR AG, Sachseln (CH)

( * ) Notice: Subject to any disclaimer, the term of this patent is extended or adjusted under 35 U.S.C. 154(b) by 0 days.

(21) Appl. No.: 14/941,024

(22) Filed: Nov. 13, 2015

(65) Prior Publication Data

US 2016/0137259 A1    May 19, 2016

(30) Foreign Application Priority Data

Nov. 14, 2014  (EP) .................................... 14003850

(51) Int. Cl.
*B62M 6/50* (2010.01)
*B62M 6/65* (2010.01)

(52) U.S. Cl.
CPC ................ *B62M 6/50* (2013.01); *B62M 6/65* (2013.01)

(58) Field of Classification Search
CPC . B62M 6/45; B62M 6/50; B62M 6/60; B62M 6/65
USPC .......................................................... 701/22
See application file for complete search history.

(56) References Cited

U.S. PATENT DOCUMENTS

| | | | |
|---|---|---|---|
| 5,031,455 A | 7/1991 | Cline | |
| 6,468,178 B1 * | 10/2002 | Mohtasham | B62M 11/16 280/238 |
| 2005/0253356 A1 * | 11/2005 | Matsueda | B62K 25/30 280/260 |
| 2011/0259658 A1 * | 10/2011 | Huang | B60K 1/04 180/65.51 |

(Continued)

FOREIGN PATENT DOCUMENTS

| | | |
|---|---|---|
| CN | 102156196 A | 8/2011 |
| CN | 103051103 A | 4/2013 |
| EP | 1 679 256 A2 | 7/2006 |

(Continued)

OTHER PUBLICATIONS

Extended European Search Report issued Apr. 22, 2015, by the European Patent Office in corresponding European Patent Application No. 14 00 3850. (8 pages).

*Primary Examiner* — McDieunel Marc
*Assistant Examiner* — James E Stroud
(74) *Attorney, Agent, or Firm* — Buchanan Ingersoll & Rooney PC

(57) ABSTRACT

The present invention provides a sensor arrangement. The signal from the sensor is used to control an auxiliary motor of a vehicle propelled by muscular strength. The auxiliary motor is there integrated into a wheel hub unit of the vehicle. The wheel hub unit comprises a stationary axle and a hub rotatably mounted to the axle. According to the invention, the assembly comprises the sensor and a freewheel of the drive train, which is propelled by muscular strength, mounted rotatable relative to the axle, where the sensor is arranged such that it detects a rotational motion of the freewheel relative to the axle.

20 Claims, 4 Drawing Sheets

(56) References Cited

U.S. PATENT DOCUMENTS

2014/0171258 A1    6/2014  Boudet

FOREIGN PATENT DOCUMENTS

Figure 1:
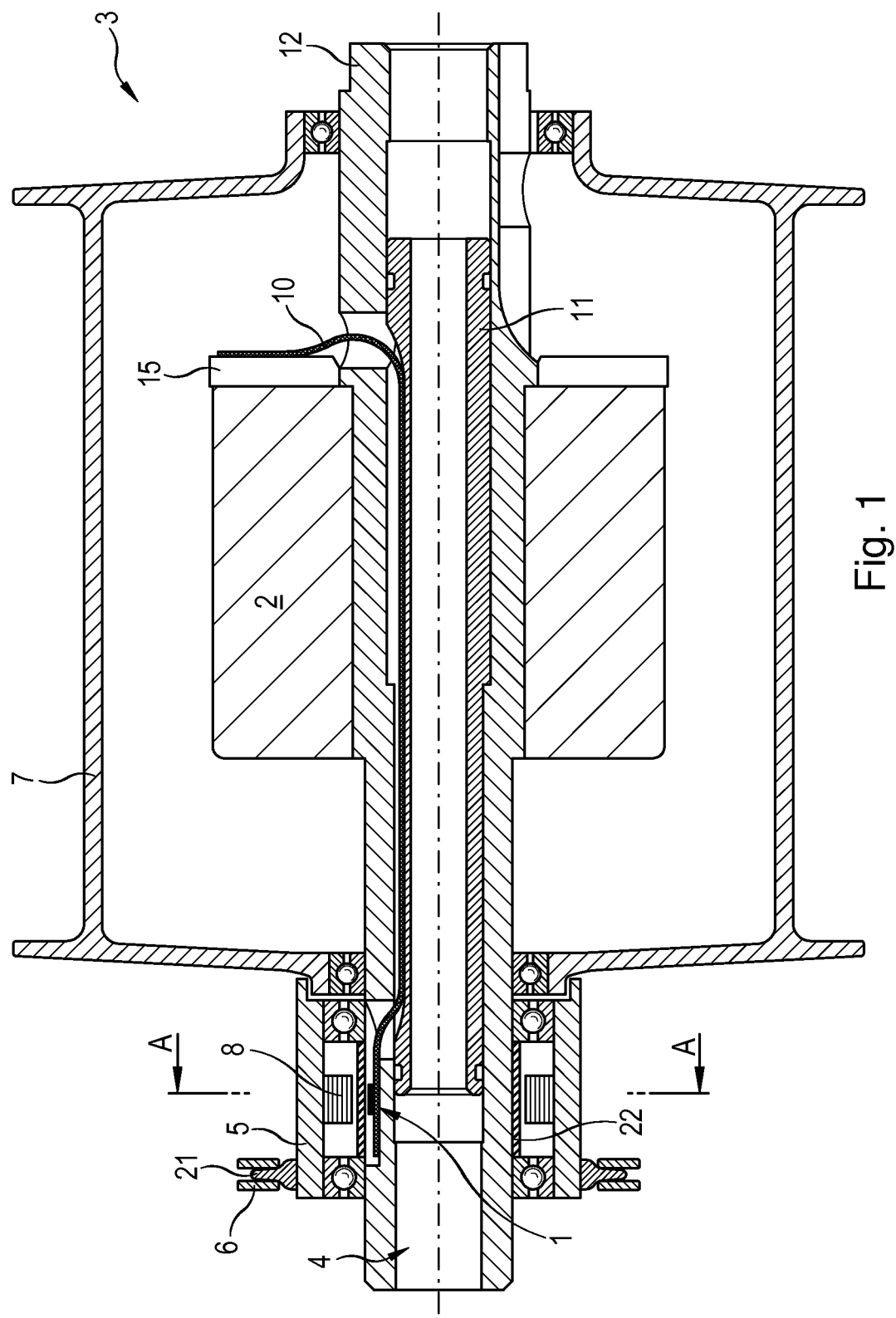

| EP | 2 799 327 A1 | 11/2014 | |
|----|----|----|----|
| JP | 2002-321680 A | 11/2002 | |
| JP | 2011-110944 A | 6/2011 | |
| WO | WO 2011/038481 A1 | 4/2011 | |
| WO | WO2011038481 A1 * | 4/2011 | ............. B60B 27/04 |
| WO | WO 2012/123801 A1 | 9/2012 | |
| WO | WO2012/125165 A1 | 9/2012 | |
| WO | WO 2013/097281 A | 7/2013 | |
| WO | WO 2014/174403 A1 | 10/2014 | |

* cited by examiner

SENSOR ARRANGEMENT FOR CONTROLLING AN AUXILIARY MOTOR AND A WHEEL HUB UNIT WITH SUCH A SENSOR ARRANGEMENT

The present invention relates to an arrangement of a sensor, the signal of which is used for controlling an auxiliary motor of a vehicle propelled by muscular strength, such as an electrically assisted bicycle. The present inventions further relates to a wheel hub unit for a vehicle propelled by muscular strength.

The demand for electrically assisted bicycles, known as pedelecs and e-bikes, has in recent years steadily increased. E-bikes are outstandingly suited, for example, to bridge longer distances or to overcome considerable altitudes also with a rather low level of physical fitness. The use of an electrical auxiliary motor in particular for the elderly offers the possibility of staying active with the bicycle into advanced old age.

Meanwhile, a number of technical solutions for the integration of the electrical auxiliary motor are known. In addition to integrating the electrical auxiliary motor into the crank mechanism or in the region of the crank mechanism, auxiliary motors are also used which are integrated into a wheel hub of the bicycle. Such a solution is known, for example, from EP 2562072 A1. The electrical auxiliary motor described in this publication can be integrated either into the front wheel hub unit or into the rear wheel hub unit of the bicycle. Controlling the electrical auxiliary motor poses a particular challenge. The auxiliary motor is only to be switched on when the pedals are moved in the forward direction. It is therefore generally necessary to detect and to respectively evaluate the rotation of the crank arm for controlling the electrical auxiliary motor. If the auxiliary motor is not arranged in the region of the crank mechanism, the sensor signal must be transmitted to the control unit of the auxiliary motor over relatively long signal distances and via a corresponding electrical connection. If the electrical auxiliary drive is located, for example, in the rear wheel hub unit, then the sensor signal must via a respective electrical connecting line running along or inside the tubes of the bicycle frame be transmitted to the control unit of the auxiliary motor. The sensor signal can as an alternative thereto, but in a much more complex manner, be transmitted wirelessly.

Sensor arrangements for detecting the rotation of a shaft are basically known from prior art. It is in DE 202011107127 U1 described, for example, that the output signal of a generator integrated into the bicycle hub can be evaluated for calculating the rotational speed. A solution is described as an alternative thereto in which an encoder co-rotating with the hub is scanned by a Hall sensor connected to the axle of the bicycle hub. Scanning a magnetic encoder wheel by use of an appropriate magnetic sensor is also described, for example, in DE 19906937 A1.

The present invention is based on the object to specify a solution for the arrangement of the sensor that is most simple, secure and inexpensive.

The object is satisfied by the features of independent claim 1. According thereto, an arrangement of a sensor, the signal of which is used to control an auxiliary motor of a vehicle propelled by muscular strength, where the auxiliary motor is integrated into a wheel hub unit of the vehicle, and where the wheel hub unit comprises a stationary axle and a hub rotatably mounted to the axle, then provides a solution of the object according to the invention where the assembly comprises the sensor and a freewheel of the drive train, which is propelled by muscular strength, mounted rotatable relative to the axle, where the sensor is arranged such that it detects a rotational motion of the freewheel relative to the axle.

The solution according to the invention provides the advantage above all that the sensor and the auxiliary motor are arranged very close to each other, whereby complex wiring of the sensor is no longer necessary. In addition, both the sensor as well as the auxiliary motor can be integrated into the wheel hub unit, so that it can be sold as a fully insertable module and be installed without major installation effort. The invention also for this reason provides a particularly reliable and inexpensive solution.

The wheel hub unit is preferably a rear wheel hub unit of a bicycle. The auxiliary motor is further preferably an electric motor. The latter is further preferably integrated into the hub. However, integration into the wheel hub unit there does not preclude that the electric motor be alternatively arranged, for example, adjacent to the hub and fixedly attached to the axle The freewheel is preferably the chain free wheel of the bicycle which is rotatably supported relative to the axle and relative to the hub and in the respective forward motion of the pedal can by use of pawls, clamping elements, clamping balls, or gearing be brought into entraining engagement with the hub. The freewheel is preferably arranged laterally adjacent to the auxiliary motor. A chain freewheel is in the context of the present application also to be understood as being a belt-driven freewheel.

Advantageous embodiments of the present invention are the object of the dependent claims.

In a preferred embodiment of the present invention, the arrangement further comprises the axle, where the sensor is attached to the axle. The sensor is in this manner integrated into the wheel hub unit in a space-saving manner and above all secure from being damaged.

In a further particularly preferred embodiment of the present invention, the freewheel comprises a ring magnet, where the sensor comprises at least one magnetic sensor for scanning the ring magnet. This embodiment is particularly inexpensive and easy to configure. Above all, this embodiment also further enables reliable detection of the rotation of the freewheel when further components must be accommodated between the freewheel and the sensor. For example, a sleeve can in this embodiment further be disposed between the freewheel or the ring magnet and the sensor and be slid onto the axle and cover the sensor and protect it from being damaged. The sleeve is there made of non-ferromagnetic material and is preferably fabricated from aluminum or plastic. The ring magnet encloses the axle and is preferably disposed being coaxial to the axle.

In order to be able to detect the rotation of the freewheel as precisely as possible, the ring magnet is according to a further preferred embodiment configured as a permanent magnet and there comprises a plurality of poles uniformly distributed over the circumference of the ring magnet. The ring magnet particularly preferably comprises 16 poles.

In a further preferred embodiment of the present invention, the magnetic sensor is a Hall sensor. Hall sensors are particularly well suited to scan also relatively weak magnetic fields. In addition, Hall sensors are meanwhile available having an extremely compact design and are in addition inexpensive. The arrangement can be effected particularly compact if the magnetic sensor is in a further preferred embodiment configured as a flip-chip sensor.

In a further particularly preferred embodiment of the present invention, the sensor comprises two magnetic sensors which are arranged spaced from each other in the circumferential direction.

By using two magnetic sensors, also the direction of rotation can be reliably determined. It is in this manner prevented that the auxiliary motor is switched on even though the cyclist pedals not forward but backward. In order to ensure flawless sensing, the angular distance between the two magnetic sensors is preferably less than the partition of the ring magnet. The angular distance preferably bears about half of the partition.

The sensor is in a further particularly preferred embodiment of the present invention arranged on a flexible printed circuit board, where the flexible printed circuit board comprises an electrical connection for connecting the sensor to a control unit of the auxiliary motor. Mounting the wheel hub unit is in this embodiment significantly simplified. In addition, a reliable electrical connection between the sensor and the control unit is thereby ensured. The electrical connection is there integrated in the form of conductor tracks in the flexible circuit board. Any elaborate cabling is dispensed with.

The flexible printed circuit board according to a further embodiment particularly preferably comprises at least one portion which is formed as an elongate strip. The elongate strip can be particularly easily led along the axle or through the axle, the latter alternative being preferred. The electrical connection is in this manner accommodated securely and protected from being damaged.

The axle in a further very particularly preferred embodiment of the present invention comprises an outer axle element and an inner axle element inserted into the outer axle element, where at least one portion of the flexible circuit board extending between the sensor and the control unit is led between the outer axle element and the inner axle element. The electrical connection between the sensor and the auxiliary motor or its control unit, respectively, is in this manner accommodated particularly well protected from being damaged. The outer axle element and the inner axle element are further preferably each configured as being substantially hollow-cylindrical. The inner axle element there preferably abuts the inner wall of outer axle element. The outer axle element further preferably comprises two openings for the flexible circuit board to be passed through. One of the openings is there in the region of the sensor, the other in the region of the electric control unit or at a location where the electrical connection muss exit from the axle to the control unit. The two openings are further preferably substantially at oppositely disposed ends of the axle.

It is further advantageous if the inner axle element comprises a groove or a recess at the outer side extending in the direction of the axle for receiving the flexible circuit board. In addition to the circuit board being accommodated in a protected manner, assembly is thereby also facilitated. Alternatively, it is conceivable to introduce the groove or the recess into the inner wall of the outer axle element. An outer groove of the inner axle element, however, can be considerably easier to manufacture.

More preferably, the outer axle element comprises a depression or recess on the outer side for the sensor. The sensor is then firstly integrated in a compact manner in the axle of the wheel hub unit. Secondly, the sensor is thereby accommodated in a protected manner since it does not protrude beyond the outer circumference of the axle.

In a further particularly preferred embodiment of the present invention, the axle is embodied as a magnetic back iron of the ring magnet. The magnetic flux density and thereby also the sensor signal are thereby enhanced. Reliable detection of the rotation is therewith ensured.

The present invention also provides a wheel hub unit for a vehicle propelled by muscular strength with the arrangement according to the invention. An advantageous embodiment of the present invention is explained in more detail below with reference to drawings, where FIG. 1: shows a longitudinal sectional view through a wheel hub unit according to the invention, FIG. 2: shows an exploded view of the axle of the wheel hub unit according to the invention of FIG. 1, FIG. 3: shows a flexible printed circuit board in a top view in which the sensor of the wheel hub unit according to the invention of FIG. 1 is applied, FIG. 4: shows a cross-section through the wheel hub unit according to the invention along section line A shown in FIG. 1.

It applies to the following embodiments that like parts are designated by like reference numerals. If a drawing contains reference numerals which are not explained in more detail in the accompanying figure description, then reference is made to preceding or subsequent figure descriptions.

FIG. 1 shows a partially simplified or schematic longitudinal sectional view of a wheel hub unit 3 according to the invention which is configured for driving the rear wheel of a bicycle. The wheel hub unit comprises a stationary axle 4 which is arranged between the dropouts of the bicycle frame, not shown, and firmly attached to the frame. Hub 7 of the rear wheel—also not shown—is rotatably mounted on stationary axle 4. Hub 7 can be driven in a conventional manner with muscle strength. A chain 6 is provided for this and extends at rear wheel axle 4 between a chain ring of the crank arm and a respective sprocket 21 of the rear wheel axle. Sprocket 21 is disposed on a free-wheel 5 which is rotatably mounted relative to hub 7 and relative to axle 4 and with a gearing apparatus—not shown—engages with hub 7 when the pedal attached to the crank arm is moved in the forward direction.

An electric motor 2 is as an auxiliary motor additionally integrated into wheel hub unit 3. The auxiliary motor is only switched on when the pedals are moved. It is in the illustration shown only schematically and comprises a stator firmly connected to axle 4 and a rotor which is optionally via a gearing in entraining engagement with hub 7.

Figure 2:
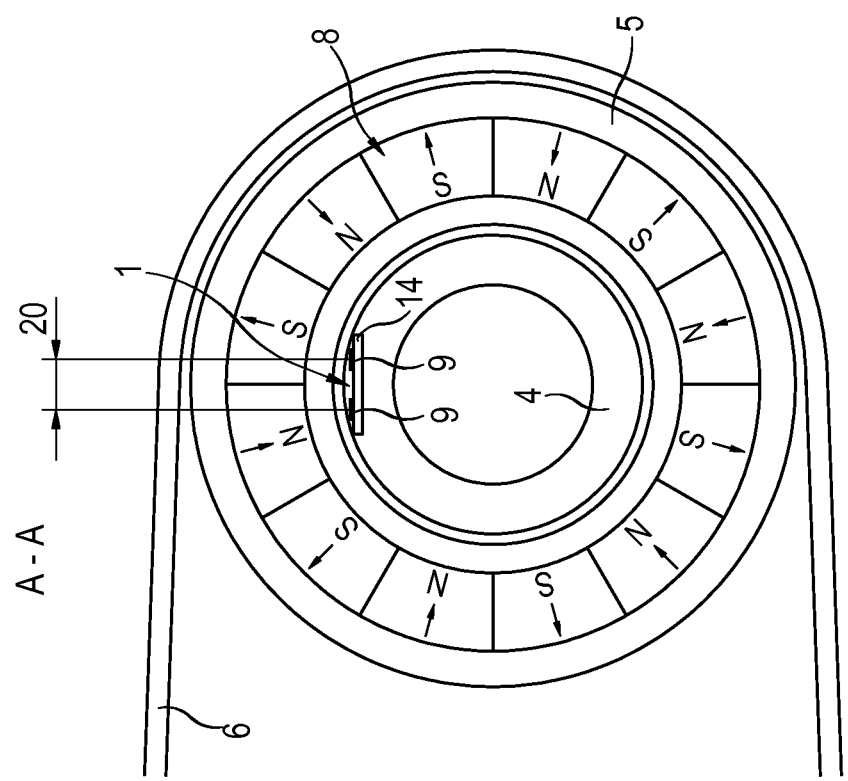

In order to control the auxiliary motor, it must be determined whether the pedals are being operated or not. For this purpose, the rotation of freewheel 5 relative to axle 4 is detected. Connected to freewheel 5 is for this purpose a ring magnet 8 which is scanned by a respective sensor 1. As shown in FIG. 1, ring magnet 8 is disposed within freewheel 5 and mounted on the inner circumference of the freewheel. Sensor 1, on the other hand, is fixedly installed on axle 4 of the wheel hub drive. The cross-sectional view in FIG. 2 shows that ring magnet 8 as configured to have multiple poles. It comprises a total of 16 poles which are distributed uniformly in the circumferential direction. The ring magnet can be formed by segments which are polarized alternately differing in the radial direction. The ring magnet can alternatively of course also be manufactured in one piece and be magnetized accordingly. It is in FIG. 2 further to be seen that sensor 1 is composed of two Hall sensors 9 which are disposed spaced apart when viewed in the circumferential direction. Spacing 20 amounts to approximately half of the partition of the ring magnet. Using two sensors allows for determining the direction of rotation of the freewheel. It is thereby avoided that auxiliary motor 2 is switched on although the pedals are moved not in the forward direction, but in the reverse direction.

Figure 3:
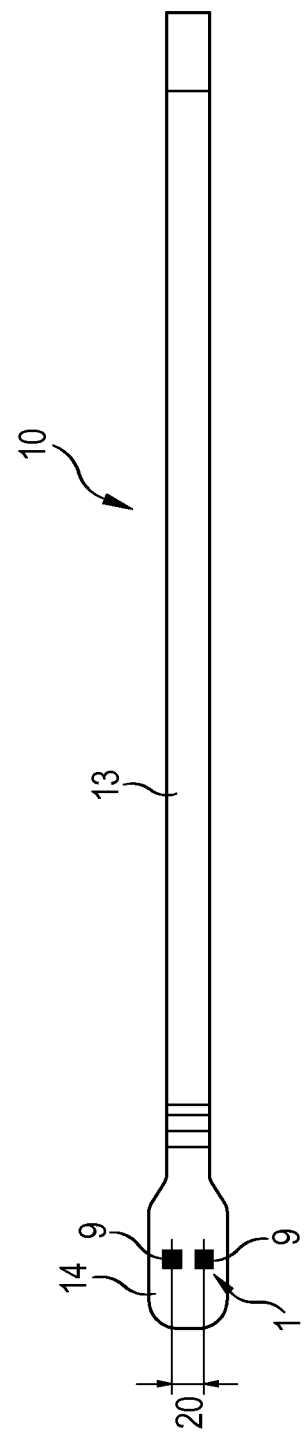
Figure 4:
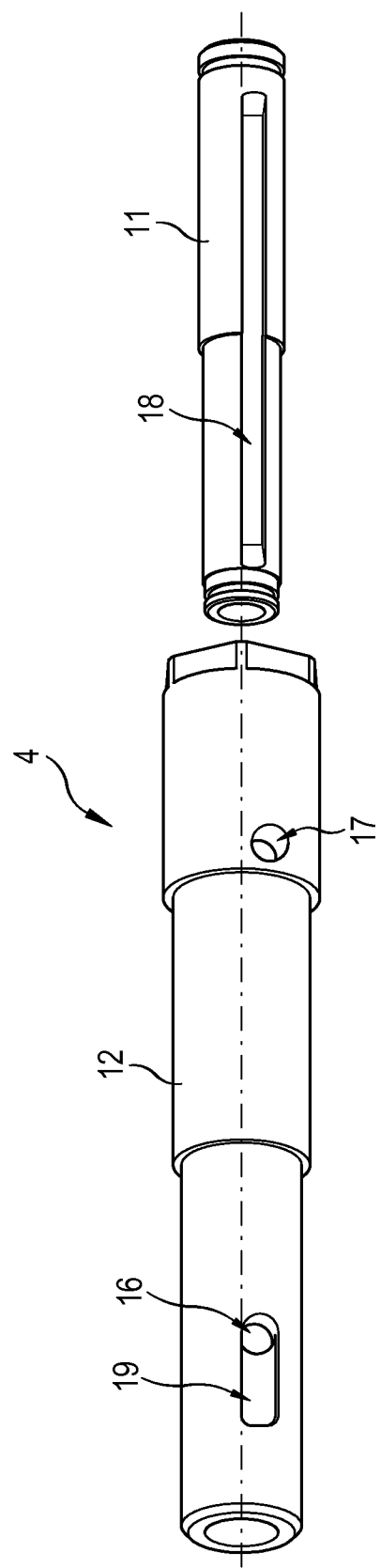

The two Hall sensors 9 are formed as flip-chip sensors and applied to head portion 14 of flexible printed circuit board 10 shown in FIG. 3. Flexible circuit board 10 is configured overall being elongate and in addition to head portion 14 comprises an elongate strip 13 in which the conductor tracks run which form the electrical connection between the sensor and the control unit 15 of auxiliary motor 2 shown schematically in FIG. 1. As shown in FIG. 1, the flexible circuit board is passed through stationary axle 4. For this purpose, the stationary axle has two through-holes. As shown in FIG. 1 and in FIG. 4, axle 4 is constructed in two parts and comprises an outer axle element 12 and an inner axle element 11 inserted into outer axle element 12. Both axle elements are configured substantially hollow-cylindrically, where the inner axle element abuts the inner wall of the outer axle element. The two through-holes 16 and 17 shown in FIG. 4 for the flexible conductor film are formed in outer axle element 12. In addition to the left through-hole 16, a recess 19 is located in outer axle element 12 on the outer circumference in which head portion 14 of the flexible printed circuit board is received together with the two Hall sensors. The head portion and the two Hall sensors are covered by a sleeve 22 shown in FIG. 1 made of non-ferromagnetic material, preferably made of aluminum or plastic. The sleeve forms a spacer in the axial direction between the two roller bearings of the freewheel. It protects the sensor from being damaged. The flexible printed circuit board extends between the outer axle element and the inner axle element Inner axle element 11 comprises a groove 18 at the outer circumference respectively extending in the direction of the axle for receiving elongate strip 13 of the flexible printed circuit board.

The signals from the two Hall sensors 9 are evaluated accordingly by control unit 15 of auxiliary motor 2. The speed and also the acceleration can there be determined. This information can be used to control the degree of support by auxiliary motor 2.

The invention claimed is:

1. An arrangement of a sensor, the signal of which is used to control an auxiliary motor of a vehicle propelled by muscular strength, where said auxiliary motor is integrated into a wheel hub unit of said vehicle, where said wheel hub unit comprises a stationary axle, a hub rotatable mounted to said axle, and a freewheel of a drive train propelled by the muscular strength which is mounted rotatable relative to said axle, and where said arrangement comprises said sensor and said freewheel, where said sensor is arranged such that it detects a rotational motion of said freewheel relative to said axle;
wherein said freewheel comprises a ring magnet, said sensor comprises at least one magnetic sensor for scanning said ring magnet, and said magnetic sensor is a Hall sensor.

2. The arrangement according to claim 1, wherein said arrangement further comprises said axle, where said sensor is attached to said axle.

3. The arrangement according to claim 1, wherein said ring magnet is configured as a permanent magnet and comprises a plurality of poles uniformly distributed over a circumference of said ring magnet.

4. The arrangement according to claim 1, wherein said sensor comprises two magnetic sensors which are arranged spaced from each other in a circumferential direction.

5. The arrangement according to claim 1, wherein said axle is embodied as a magnetic back iron of said ring magnet.

6. A wheel hub unit for a vehicle propelled by muscular strength with an arrangement according to claim 1.

7. An arrangement of a sensor, the signal of which is used to control an auxiliary motor of a vehicle propelled by muscular strength, where said auxiliary motor is integrated into a wheel hub unit of said vehicle, where said wheel hub unit comprises a stationary axle, a hub rotatably mounted to said axle, and a freewheel of a drive train propelled by the muscular strength which is mounted rotatable relative to said axle, and where said arrangement comprises said sensor and said freewheel, where said sensor is arranged such that it detects a rotational motion of said freewheel relative to said axle;
wherein said freewheel comprises a ring magnet, said sensor comprises at least one magnetic sensor for scanning said ring magnet, and said magnetic sensor is configured as a flip-chip sensor.

8. A wheel hub unit for a vehicle propelled by muscular strength with an arrangement according to claim 7.

9. The arrangement according to claim 7, wherein said arrangement further comprises said axle, where said sensor is attached to said axle.

10. The arrangement according to claim 7, wherein said ring magnet is configured as a permanent magnet and comprises a plurality of poles uniformly distributed over a circumference of said ring magnet.

11. The arrangement according to claim 7, wherein said sensor comprises two magnetic sensors which are arranged spaced from each other in a circumferential direction.

12. An arrangement of a sensor, the signal of which is used to control an auxiliary motor of a vehicle propelled by muscular strength, where said auxiliary motor is integrated into a wheel hub unit of said vehicle, where said wheel hub unit comprises a stationary axle, a hub rotatably mounted to said axle, and a freewheel of a drive train propelled by the muscular strength which is mounted rotatable relative to said axle, and where said arrangement comprises said sensor and said freewheel, where said sensor is arranged such that it detects a rotational motion of said freewheel relative to said axle;
wherein said freewheel comprises a ring magnet, said sensor comprises at least one magnetic sensor for scanning said ring magnet, and said sensor is arranged on a flexible printed circuit board, where said flexible printed circuit board comprises an electrical connection for connecting said sensor to a control unit of said auxiliary motor.

13. The arrangement according to claim 12, wherein said flexible circuit board comprises at least one portion which is formed as an elongate strip.

14. The arrangement according to claim 12, wherein said axle comprises an outer axle element and an inner axle element inserted into said outer axle element, where at least a portion of said flexible circuit board extending between said sensor and said control unit is received between said outer axle element and said inner axle element.

15. The arrangement according to claim 14, wherein said outer axle element and said inner axle element are each configured as being substantially hollow-cylinders.

16. The arrangement according to claim 14, wherein said inner axle element comprises a groove or a recess at the outer side extending in the direction of said axle for receiving said flexible circuit board.

17. The arrangement according to claim 14, wherein said outer axle element comprises a depression or recess on the outer side for said sensor.

18. A wheel hub unit for a vehicle propelled by muscular strength with an arrangement according to claim 12.

19. The arrangement according to claim 12, wherein said arrangement further comprises said axle, where said sensor is attached to said axle.

20. The arrangement according to claim 12, wherein said ring magnet is configured as a permanent magnet and comprises a plurality of poles uniformly distributed over the circumference of said ring magnet.

\* \* \* \* \*